June 17, 1941.    T. A. RICH    2,246,005
IMPULSE MEASURING AND RECORDING APPARATUS
Original Filed Nov. 26, 1938
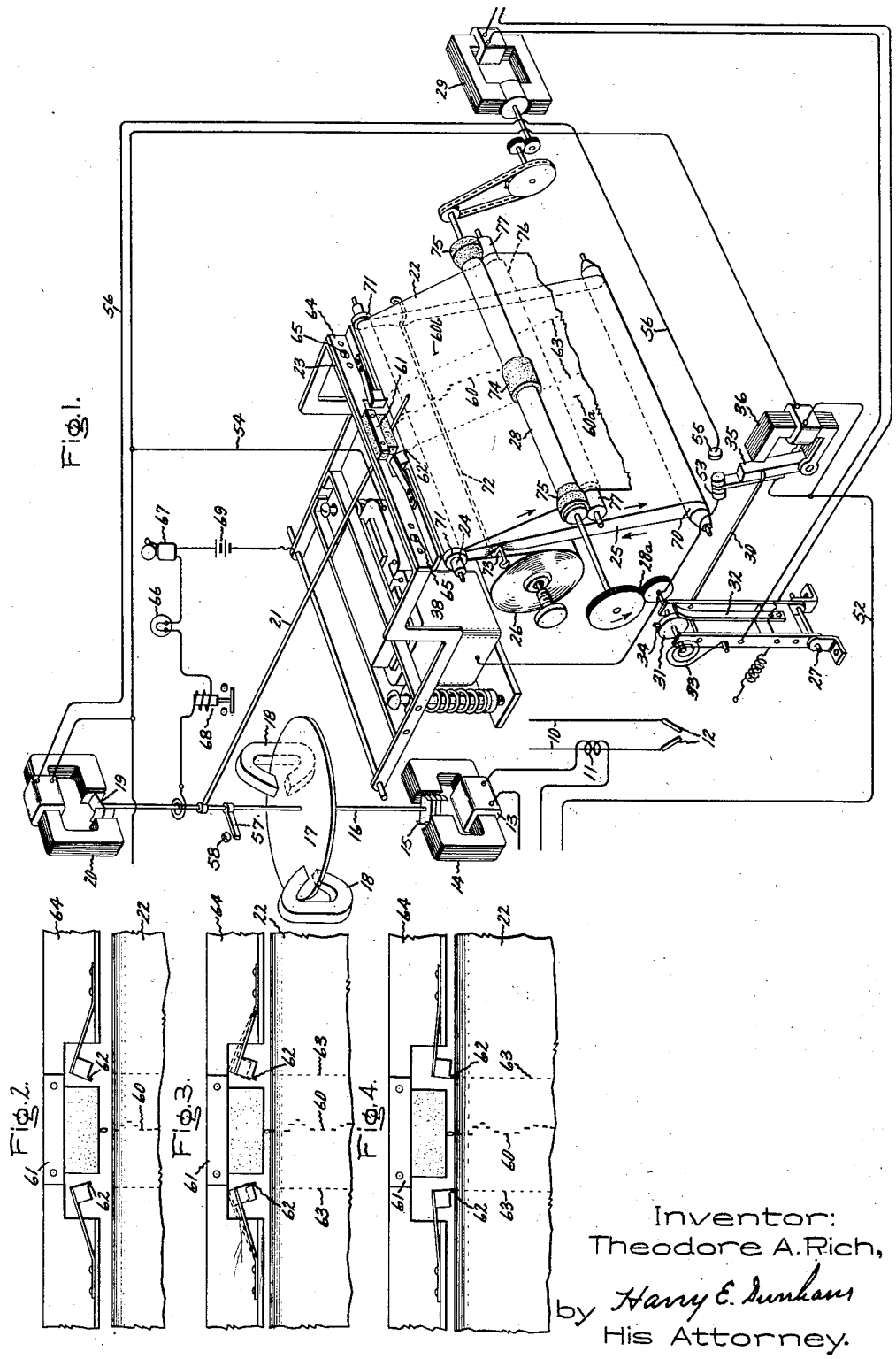
Inventor:
Theodore A. Rich,
by Harry E. Dunham
His Attorney.

Patented June 17, 1941

2,246,005

UNITED STATES PATENT OFFICE 2,246,005

IMPULSE MEASURING AND RECORDING APPARATUS

Theodore A. Rich, Schenectady, N. Y., assignor to General Electric Company, a corporation of New York Original application November 26, 1938, Serial No. 242,543. Divided and this application December 4, 1939, Serial No. 307,550

2 Claims. (Cl. 234—68)

My invention relates to apparatus for measuring and recording rapidly recurring current impulse phenomenon of varying magnitude and duration. The apparatus of my invention is particularly adapted for measuring and recording the consistency performance obtained during electric welding operations, and the invention will be explained as for such purpose, but it may be used for other purposes.

In connection with electric welding operations, it is desirable to measure and record the factors influencing each welding operation simultaneously with the welding operation in order that the operator may have a continuous record to guide him in his work and to assure that the welding operations meet the exacting specifications necessary for reliable work. The most important factors are the heating rate of the welding current and its duration, the pressure and area of electrodes, and the conditions of surfaces. The measurement and control of pressure, area and surfaces is readily measured by commonplace means. The device here described measures the ampere-squared-seconds of the welding current.

This application is a division of my application Serial No. 242,543, filed November 26, 1938 on an impulse measuring and recording apparatus, said parent application containing claims directed primarily to the subject matter of the novel galvanometer described herein. The present application contains claims directed to certain novel features of the recording apparatus for printing spaced calibration marks on the record sheet. Another divisional application Serial No. 269,805, filed April 24, 1939 contains claims directed to the novel timing control of the galvanometer recorder. Another divisional application, Serial No. 269,806, filed April 24, 1939 contains claims directed to a novel means for stopping advance of the recording chart when recording operations cease. Another divisional application is being filed concurrently herewith containing claims directed to features for keeping the recording tape and chart straight as they are advanced.

The features of my invention which are believed to be novel and patentable will be pointed out in the claims appended hereto. For a better understanding of my invention reference is made in the following description to the accompanying drawing in which Fig. 1 represents a general perspective view of a recorder embodying my invention and Figs. 2, 3 and 4 show enlarged front views of the recording mechanism of my invention with the parts thereof in the different positions which they will assume at different stages preceding and during a recording operation. The galvanometer represented comprises essentially three parts, first a measuring element energized by coil 13, and having a two-pole stationary magnet 14 and a two-pole magnetic armature 15 secured to the rotary shaft 16; second, a damping element consisting of a disk 17 of conducting material secured to shaft 16 and one or more stationary permanent magnets 18 which convey a damping flux through the disk 17 for damping purposes; and third, a zero return element consisting of a two-pole magnetic vane 19 secured to shaft 16 and a two-pole stationary field magnet 20 which when energized tends to turn its vane 19 into alignment with its pole pieces at approximately the zero position of the shaft 16. A recording arm 21 is secured to shaft 16, and its outer end extends freely between a record sheet 22 and a printing rod 23.

The record printing apparatus may comprise a printing platen 24 in the form of a roller beneath the printing rod 23. About drum 24 is a belt 25 of carbon paper or its equivalent. The record sheet 22 is preferably sufficiently thin as to be transparent so that when the printing rod 23 forces pointer 21 down against the printing platen with the record sheet and carbon paper intervening, a mark is made on the under surface of the record sheet of the position of pointer 21, which mark is visible through the transparent sheet. 26 represents a supply roll for the record sheet, and 28 a driving drum for the record sheet. 29 is a small timing motor used for driving the drum 28 for advancing the chart 22. The advance of chart 22 rotates roller 24 and since the carbon paper belt 25 is about roller 24 in contact with chart 22 the carbon paper belt 25 is also advanced by motor 29. The carbon paper belt 25 is advanced over roller 24 at about the same rate as the record sheet is advanced above it, but, except during the instance of printing, the carbon paper does not transfer marking material to the record sheet.

In order automatically to stop the advance of the record sheet when welding operations are temporarily discontinued, I have provided a special contact device for opening the circuit of the timing motor 29. The contacts of this device comprise a metal wheel 31 and a resilient metal brush 32 bearing against the wheel 31 and included in the circuit of motor 29.

As here shown, the metal wheel 31 is urged in a counterclockwise direction by a light spiral spring 33 and has an insulating finger 34 extending from its periphery which, if rotated clockwise against the upper end of contact 32, forces the contact away from wheel 31 to open the circuit of the timing motor 29. This contact mechanism is pivotally mounted at 27 and is connected with the armature 35 of a relay 36 by rod 30. This relay 36 is energized following the occurrence of a welding surge in a welding circuit 10. When the relay 36 is deenergized, the metal wheel 31 is rotated in a clockwise direction since it is on a shaft geared at 28a to the shaft of roller 28 driven by timing motor 29 and in this condition, which is that represented in the drawing, wheel 31 will be driven clockwise so long as the timing motor remains energized through contacts 31 and 32.

It is seen that in a short time interval, if the relay 36 is not energized, insulating finger 34 will rotate against spring finger 32 and move it away from wheel 31 to break the timing motor circuit.

This condition of affairs will remain until relay 36 is energized. When this happens the contact assembly is swung to the right about pivot 27 and the gears at 28a are separated. Now spring 33, which has been wound up, can rotate 31 counter-clockwise until finger 34 is stopped by contact with a stop 34a. Finger 32 is now in contact with wheel 31 and the timing motor starts in operation to advance the record sheet. Ordinarily when surges to be recorded are coming in at a rate of say once per second, the finger 34 does not reach contact 32 but is repeatedly returned against its stop and the timing motor circuit remains energized to advance the record sheet continuously, but as soon as relay 36 remains deenergized for a somewhat longer period, which period may be made anything desired, the timing motor circuit is again opened and remains open until the next surge to be recorded occurs. It will be evident that with this arrangement the record sheet will always be advanced so as to leave a clean portion of the record sheet in recording position when the motor stops and hence the first impulse that comes in and starts the timing motor will be properly recorded. This expedient not only saves considerable recording and carbon paper, but it saves wear and tear on the recording apparatus and useless operation of the timing motor. Delays incident to renewing the recording paper supply are reduced, and the records which are obtained are condensed and easier to study than if scattered over an unnecessary length of record sheet.

The printing rod 23 extends over the recording swing of pointer 21 and may be resiliently suspended and provided with a magnet 38 which will be momentatrily energized at the proper time, as hereinafter explained, to perform a recording operation.

The deflecting, damping and zero return torques of the recorder are large in comparison with the moment of inertia of the moving parts mounted on shaft 16.

In the iron vane type of measuring instrument here used the deflecting torque is proportional to the square of the current (I) flowing in its coil 13. The damping torque is proportional to the angular velocity ($w$) which is equal to a damping constant K times $I^2$. The angular travel of the pointer from a zero position, when there is no zero restoring torque and neglecting friction and moment of inertia, is equal to the average angular velocity $KI^2$ multiplied by the time duration ($t$) of the surge. The moment of inertia of the moving parts of the instrument is made small in comparison with the torques referred to and therefore does not materially alter the deflection characteristics of the instrument, but to the extent that it does it may be compensated for according to the following explanation. That small portion of the up-scale torque of the instrument during acceleration of the pointer up scale, which is used up in overcoming the inertia of the moving parts is substantially equivalent to the kinetic energy remaining in the moving parts when the up-scale torque ceases. This will cause the pointer to continue to be moved up-scale until this energy is used up by the opposing damping torque. If then at the end of a surge we allow pointer 21 to move up-scale until stops before we print the record, the recording position of the pointer will be proportional to $I^2t$ within a negligible degree of error. If the surge is of relatively low current value the acceleration and deceleration forces of the moving parts will both be correspondingly small. If the surge is of a relatively high current value the acceleration and deceleration forces will both be correspondingly large so that as long as we allow the pointer to come to rest before the record is printed the recording position will be proportional to $I^2t$. The zero return magnet 20 is energized from a constant voltage source and hence produces a zero return torque which is constant for a given deflection and is proportional to the up-scale deflections and reduces to approximately a zero value at the zero position of the shaft.

There will be provided a timing system, not shown, responsive to a surge for delaying the printing of the position of the recording arm 21 for a suitable period after the end of each surge and also for controlling the time sequence of operations necessary to print the record and restore the printing arm to a zero position in readiness for the next surge.

The nature of the records obtained are shown by the dots indicated at 60 on record sheet 22. As illustrated, the printing rod 23 is provided with a removable or adjustable section 61 of insulating material such as rubber. Adjacent the lateral boundaries of this insulated section there are provided raised printing ridges 62, which, when the printing relay 38 is energized, print boundary lines 63 on the record sheet 22 when the records 60 are printed.

The front section 64 of the printing rod which holds rubber part 61 and the boundary printing ridges 62 is either removable or adjustable. In the example shown, the adjustable part 64 is fastened to the main part 23 of the printing rod by screws 65. When these screws are removed, part 64 with insulating part 61 and the boundary printing ridges may be moved laterally or removed entirely and replaced by another section having the insulated part wider or narrower than the part 61 of Fig. 1 or at a different lateral position or both and with boundary printing ridges 62 adjacent its lateral edges. The boundary printing lines 63 are helpful in the calibration and use of the apparatus. These lines are so spaced with respect to the calibration of the instrument as to mark the upper and lower limits of satisfactory welding surges and so long as the records fall between these lines, as shown for example by the records 60 in Fig. 1, the welder is assured that the welding surges contain the proper amount of heat energy to give satisfactory welds.

If the records 60 go lower as at point 60a or higher as at point 60b than the limits set, it may be assumed that something is wrong with the power control apparatus or the welding apparatus, and the trouble should be located and corrected before further welding operations are made.

If pointer 21 is outside the boundary limits 62 to any appreciable extent when a record is made such as at 60a or 60b, the pointer is opposite a conducting portion of the printing rod and an electric contact is made between the metal pointer and metal rod at the instant of printing. This contact arrangement is included in a circuit which may include one or more of the following; a visual signal 66, an audible signal 67, a control relay 68, as well as a source of supply 69. The relay 68 may be arranged to shut off the power supply to the welder so that no further use thereof may proceed until the apparatus has been checked and the condition corrected. When the pointer is opposite the insulated part 61 when the record is printed the lower edge of the insulated part strikes the pointer and hence the signal or control circuit is not energized for satisfactory welding surges. The connection of the signalling circuit to the recording pointer shaft should be through a connection such as a weak spiral which has negligible turning effect on the shaft in any position.

It will be noted that the boundary printing ridges 62 are not secured rigidly to the front section 64 of the printing rod but are mounted on the free ends of resilient fingers riveted to the part 64. It will also be noted that the printing bar is recessed adjacent the insulated part 61, providing pockets for the weighted printing ridges 62. The clearances about ridge members 62 are shown somewhat larger than is necessary for the sake of clear illustration. It will further be noted that in the idle condition shown in Fig. 2 the lower edges of the printing ridges 62 do not extend lower than about the lower edges of the insulating part 61 and printing bar 64. This arrangement allows the printing bar to rest close to the pointer 21 and chart 22 without having the printing ridges interfere with the free swing of the pointer therepast, and also allows the printing ridges to move downward beyond the printing bar 64 in a printing operation. It is evident that in order for the printing ridges 62 to strike the chart they must move downward beyond the lower extremity of the printing bar at least the distance corresponding to the vertical thickness of the pointer. In a printing operation when the downward motion of the printing bar is suddenly stopped by the pointer being driven against the printing platen as shown in Fig. 3, the printing ridges 62, being resiliently mounted, continue to move downward by reason of their inertia and print the marginal lines 63 as shown in Fig. 4.

In order to avoid trouble with the carbon paper belt 25 and record paper 22, I have found that certain precautions are very desirable. It is difficult to provide a carbon paper or cloth belt 25 of exactly the same length at both ends. For example, the belt may be formed by a sheet of carbon paper of the desired width and length which, when the ends are pasted together, form a belt. In pasting the ends of the sheet together to form a belt, one peripheral side of the belt may be found to be 1/16 inch longer than the other in spite of care being taken to prevent any such discrepancy. Such a belt when simply placed on parallel rollers such as the rollers 24 and 70 and driven as here contemplated, will not run true but will invariably work endwise towards that end of the belt which is the longest. Even collars such as collars 71 shown at the ends of roller 24 will not prevent an uneven belt of carbon paper from working endwise and climbing out over such collar. This troublesome difficulty has been overcome by the use of a wrinkle bar 72 having bends 73 beneath the paper belt near the ends of such belt where it is fed onto roller 24. These bends crowd the end edges of the paper belt inward and cause it to wrinkle up slightly just as it passes into platen roller 24 and the belt is made sufficiently loose to permit this without tearing. When the belt passes over roller 24, the chart paper 22 is outside and under sufficient tension to drive the carbon paper belt and to flatten out the wrinkles in and without causing creasing of the carbon paper. This pressing and driving action of chart 22 on the carbon paper over a limited periphery of roller 24 allows the belt to adjust itself, the wrinkles in the long end of the belt apparently being pressed out in a forward direction and the wrinkles in the short end of the belt apparently being pressed out in a retarding direction to the extent necessary to allow an uneven belt to be driven without working endwise. Actually, the long end of the belt is driven faster than the short end, due to the adjustment allowed incident to the smoothing out of the wrinkles to the extent necessary to compensate for the difference in peripheral length of the belt at its opposite ends.

The chart 22 used is a relatively thin lightweight paper in order that it will be sufficiently transparent to enable the records, which are made on the under side of the chart, to be clearly visible therethrough. It is impracticable to drive such a chart with a toothed drum having driving teeth projecting through holes punched along the edges of the chart. The chart driving arrangement used, and which has been referred to generally above as a driving drum 28, requires some further explanation. The driving drum 28 may be constructed as indicated in Fig. 2 having a soft rubber cylindrical driving section 74 at its center and soft rubber inwardly tapered guiding sections 75 at its two ends. The remainder of this drum is made of reduced diameter and may be made up of metal parts which serve as supporting and spacing parts, but do not enter into driving contact with the paper. Beneath driving drum 28 is another drum made up of a long central part 76 and short end parts 77. These three parts are so supported as to be freely rotatable independently of each other. Part 76 is pressed in driving contact with section part 74 of drum 28 and the chart is gripped between these two parts and they constitute the main driving elements of the arrangement. End roller parts 77 are slightly smaller in diameter than part 76 and they are in driving contact with the outer cylindrical portions of section guide roller parts 75. The maximum diameter of parts 75 is slightly greater than the diameter of cylindrical part 74, but the minimum diameters of these parts are the same. The chart is of a width equal to the distance between the inner ends of parts 75 and is normally driven in a central position with its end edges in line with the inner ends of the parts 75. In case the chart tends to creep towards one side or the other of such central position, one edge rides up on the cone-shaped surface of part 75 and there is an immediate tendency for such edge to be driven faster than the middle of the chart due to the increased diameter of part 75 and the fact that parts 74 and 75 are driven at the same speed. This straightens the chart and returns it to a central driving position. This correcting effect of the cone-shaped roller parts 75 at any instant is in proportion to extent of chart displacement from a central position at the driving drum. Guide collars 71 maintain the chart properly centered under the recording position and hence such correcting effects as occur at the driving drum do not displace the record on the chart.

What I claim as new and desire to secure by Letters Patent of the United States is:

1. In a recording instrument, a recording arm adapted to move over a chart in response to phenomena to be recorded, a movable recording bar above said chart for momentarily moving said recording arm into contact with said chart to produce a record of the position of said arm, and spaced recording markers on said bar for producing spaced calibration marks on said chart with each recording operation, said markers being resiliently secured to said recording bar and normally positioned with their recording surfaces approximately in alignment with the lower edge of the recording bar whereby during a recording operation said markers are permitted to move downward onto the chart beyond the lower edge of the recording bar.

2. In a recording instrument, a printing platen over which a chart is advanced, a recording arm movable over said chart, a movable recording bar above said arm and chart opposite the printing platen, means for suddenly and momentarily moving said recording bar downward to move the arm into contact with said chart to produce a record of the position of said arm, spaced recording markers on said recording bar for producing spaced calibration marks on said chart during a recording operation, said markers being mounted on the free ends of resilient arms secured to the recording bar with their recording surfaces normally positioned in approximate alignment with the lower edge of the recording bar so as not to interfere with the free movement of the recording arm therepast when the recording bar is in raised position, the inertia of said spaced markers serving to move them downward into contact with the chart when the downward movement of the recording bar is stopped during a recording operation.

THEODORE A. RICH.